United States Patent
Lee et al.

(10) Patent No.: US 9,433,005 B2
(45) Date of Patent: Aug. 30, 2016

(54) METHOD FOR MITIGATING INTER-CELL INTERFERENCE IN WIRELESS COMMUNICATION SYSTEM AND DEVICE THEREFOR

(71) Applicant: LG ELECTRONICS INC., Seoul (KR)

(72) Inventors: Seungmin Lee, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 14/349,040

(22) PCT Filed: Oct. 18, 2012

(86) PCT No.: PCT/KR2012/008538
§ 371 (c)(1),
(2) Date: Apr. 1, 2014

(87) PCT Pub. No.: WO2013/058571
PCT Pub. Date: Apr. 25, 2013

(65) Prior Publication Data
US 2014/0254531 A1    Sep. 11, 2014

Related U.S. Application Data

(60) Provisional application No. 61/548,230, filed on Oct. 18, 2011, provisional application No. 61/552,437, filed on Oct. 27, 2011.

(51) Int. Cl.
*H04W 72/08* (2009.01)
*H04L 5/00* (2006.01)
*H04J 11/00* (2006.01)

(52) U.S. Cl.
CPC ......... *H04W 72/082* (2013.01); *H04J 11/0056* (2013.01); *H04L 5/006* (2013.01)

(58) Field of Classification Search
CPC .. H04W 72/082; H04W 72/08; H04L 5/006; H04L 5/00; H04J 11/0056
See application file for complete search history.

(56) References Cited

U.S. PATENT DOCUMENTS

2008/0108363 A1    5/2008    Yu et al.
2008/0268833 A1*  10/2008    Huang .................. H04B 7/024
                                                                455/425

(Continued)

FOREIGN PATENT DOCUMENTS

CN    102186247 A    9/2011
JP    2010-524306 A    7/2010

(Continued)

OTHER PUBLICATIONS

Huawei, HiSilicon, "Signaling and UE Behaviors for Resource-Specific CSI Measurements," 3GPP TSG RAN WG1 meeting #63, Jacksonville, USA, Nov. 15-19, 2010, R1-105852, 4 pages.

(Continued)

*Primary Examiner* — Noel Beharry
*Assistant Examiner* — Ruihua Zhang
(74) *Attorney, Agent, or Firm* — Birch, Stewart, Kolasch & Birch, LLP

(57) ABSTRACT

The present application provides a method for allowing a cell to remove inter-cell interference in a wireless communication system. Specifically, the method includes receiving, from neighboring cells, time resource interference information on a first subframe type and a second subframe type; receiving, from said neighboring cells, first frequency resource interference information corresponding to said first subframe type and second frequency resource interference information corresponding to said second subframe type; and performing downlink communication and uplink communication by using said first frequency resource interference information, said second frequency resource interference information, and said time resource interference information.

14 Claims, 11 Drawing Sheets

(56) References Cited

U.S. PATENT DOCUMENTS

| | | |
|---|---|---|
| 2009/0181708 A1 | 7/2009 | Kim et al. |
| 2011/0075611 A1* | 3/2011 | Choi ............... H04L 1/1819 370/329 |
| 2012/0014333 A1* | 1/2012 | Ji ..................... H04L 5/0032 370/329 |
| 2013/0225194 A1 | 8/2013 | Sung et al. |
| 2013/0295949 A1* | 11/2013 | Seo ................. H04J 11/005 455/452.1 |

FOREIGN PATENT DOCUMENTS

| | | |
|---|---|---|
| KR | 10-0765892 B1 | 10/2007 |
| KR | 10-0959332 B1 | 5/2010 |
| KR | 10-0991794 B1 | 11/2010 |

OTHER PUBLICATIONS

LG Electronics, "Considerations on Coexistence of Frequency and Time Domain ICIC," 3GPP TSG RAN WG1 Metting # 64, Taipel, Taiwan, Feb. 21-25, 2011, R1-110889, pp. 1-4.

New Postcom, "Considerations for interactions between FD and TD ICIC," 3GPP TSG RAN WG3 Meeting #70BIS, Dublin, Ireland, Jan. 17-21, 2011, R3-110043, pp. 1-3.

Nokia Siemens Networks, "On the benefits of Intercell interference cancellation to HSPA networks," 3GPP TSG-RAN Working Group 1 #52bis, Tdoc R1-081428, Shenzhen, China, Mar. 31-Apr. 4, 2008, 4 pages.

\* cited by examiner

FIG. 2
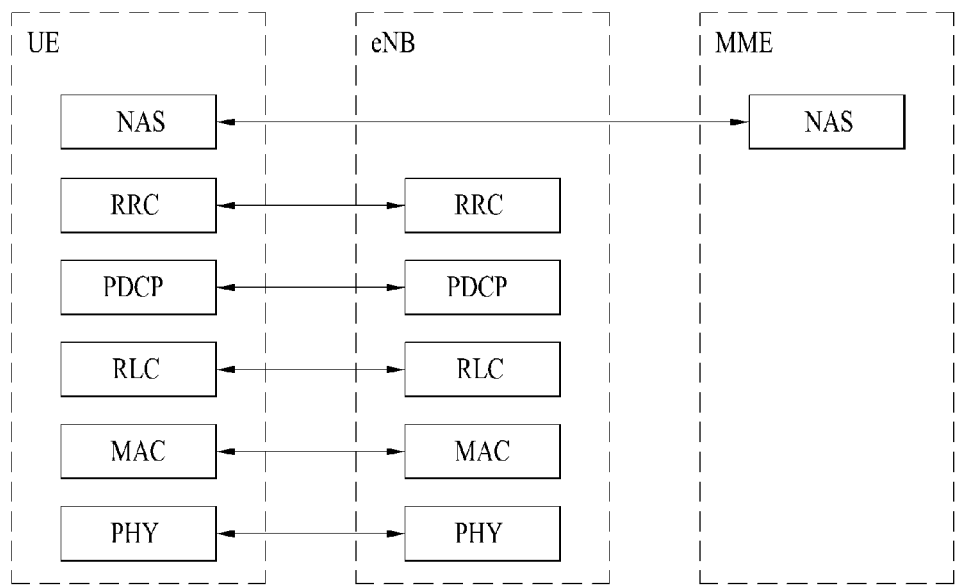
(a) Control-plane protocol stack
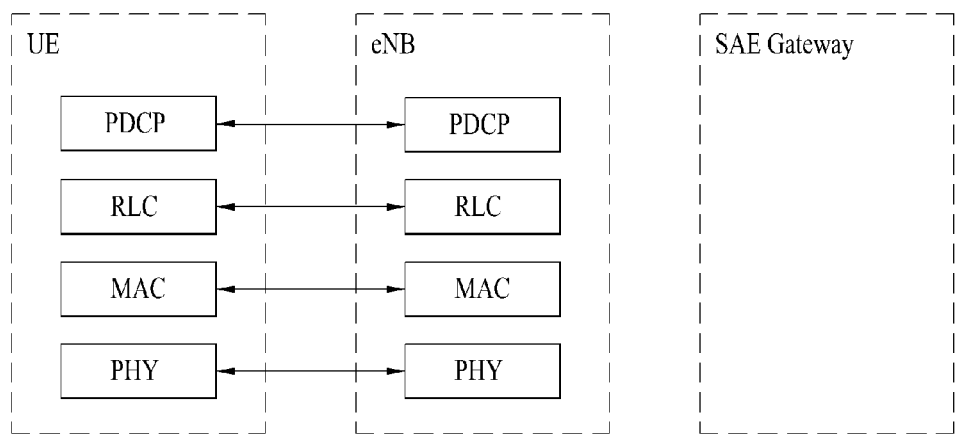
(b) User-plane protocol stack

METHOD FOR MITIGATING INTER-CELL INTERFERENCE IN WIRELESS COMMUNICATION SYSTEM AND DEVICE THEREFOR

CROSS REFERENCE TO RELATED APPLICATIONS

This application is the National Phase of PCT/KR2012/008538 filed on Oct. 18, 2012, which claims priority under 35 U.S.C. 119(e) to U.S. Provisional Application Nos. 61/548,230 filed on Oct. 18, 2011 and 61/552,437 filed on Oct. 27, 2011, all of which are hereby expressly incorporated by reference into the present application.

TECHNICAL FIELD

The present invention relates to a wireless access system, and more particularly, to a method and apparatus for mitigating inter-cell interference in a wireless communication system.

BACKGROUND ART

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

DISCLOSURE

Technical Problem

An object of the present invention devised to solve the problem lies on a method and apparatus for mitigating inter-cell interference in a wireless communication system.

Technical Solution

In an aspect of the present invention, a method for canceling inter-cell interference in a wireless communication system includes receiving time resource interference information about a first subframe type and a second subframe type from a neighbor cell, receiving first frequency resource interference information about the first subframe type and second frequency resource interference information about the second subframe type from the neighbor cell, and conducting downlink communication and uplink communication using the first frequency resource interference information, the second frequency resource interference information, and the time resource interference information.

The second subframe type may be a subframe transmitted or received with reduced power by the neighbor cell and the first subframe type may be a normal subframe.

Or the second subframe type may be a subframe in which the neighbor cell does not transmit and receive a signal and the first subframe type may be a normal subframe.

The first frequency resource interference information and the second frequency resource information may indicate whether interference with a frequency band in the first and second subframe types caused by the neighbor cell is equal to or larger than a threshold. Or the first frequency resource interference information and the second frequency resource information may indicate whether transmission power used in the first and second subframe types by the neighbor cell is equal to or larger than a threshold according to a frequency band.

The threshold for the first frequency resource interference information may be different from the threshold for the second frequency resource interference information.

The first frequency resource interference information may be bitmap information for each frequency band, and the second frequency resource interference information may be defined as a cyclic shift value of the first frequency resource interference information. If the cyclic shift value is preset, the cell may assume that neighbor cells do not cause interference in subframes of the second subframe type.

Advantageous Effects

According to embodiments of the present invention, inter-cell interference can be mitigated efficiently in a wireless communication system.

It will be appreciated by persons skilled in the art that that the effects that can be achieved through the present invention are not limited to what has been particularly described

DESCRIPTION OF DRAWINGS

FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN);

BEST MODE

Figure 1:
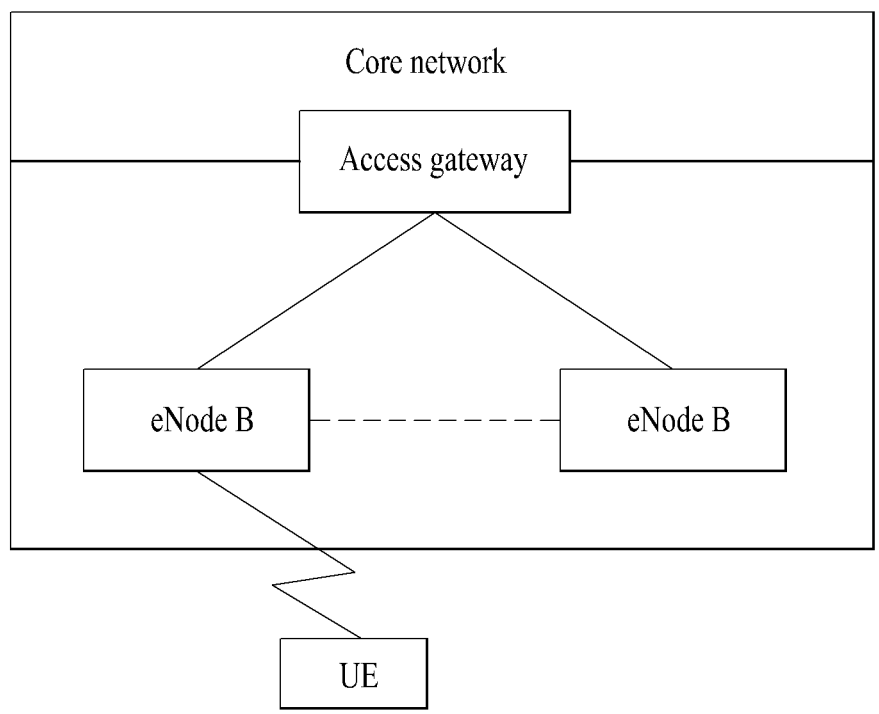
FIG. 1 illustrates a configuration of an Evolved Universal Mobile Telecommunications System (E-UMTS) network as an example of a wireless communication system.

The configuration, operation, and other features of the present invention will readily be understood with embodiments of the present invention described with reference to the attached drawings. Embodiments of the present invention as set forth herein are examples in which the technical features of the present invention are applied to a 3rd Generation Partnership Project (3GPP) system.

While embodiments of the present invention are described in the context of Long Term Evolution (LTE) and LTE-Advanced (LTE-A) systems, they are purely exemplary. Therefore, the embodiments of the present invention are applicable to any other communication system as long as the above definitions are valid for the communication system. In addition, while the embodiments of the present invention are described in the context of Frequency Division Duplexing (FDD), they are also readily applicable to Half-FDD (H-FDD) or Time Division Duplexing (TDD) with some modifications.

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
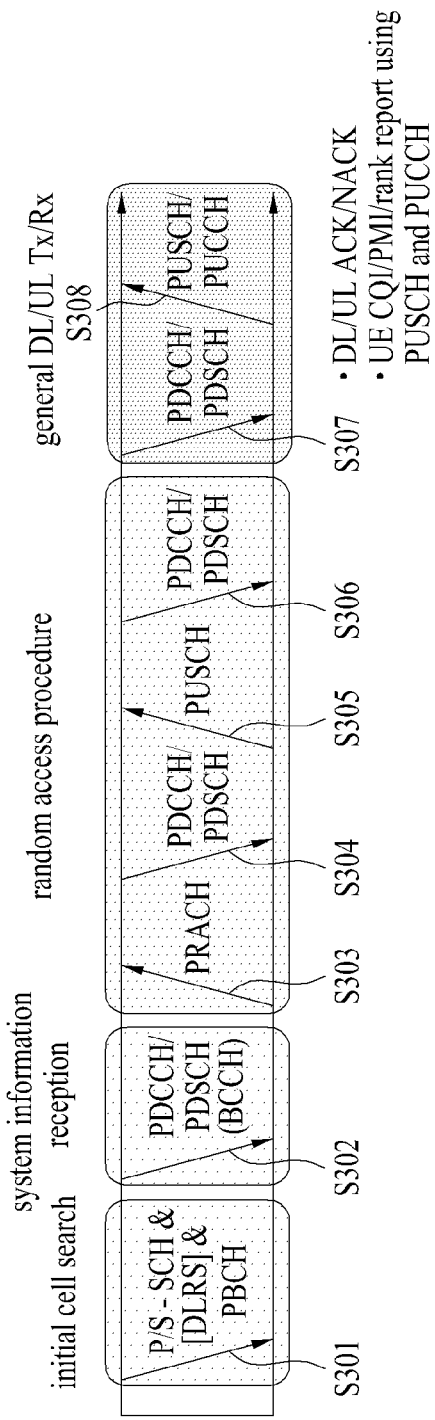
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
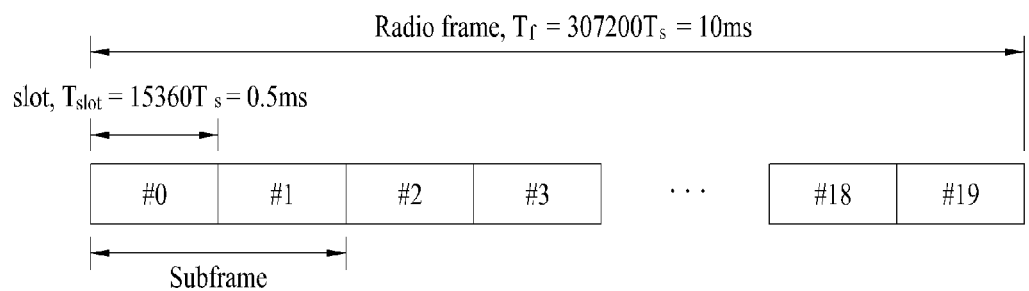
FIG. 4 illustrates a configuration of a radio frame in a Long Term Evolution (LTE) system.

FIG. 4 illustrates a radio frame structure in the LTE system. Referring to FIG. 4, a radio frame is 10 ms (327,200 $T_s$) in duration. The radio frame is divided into 10 equal-sized subframes, each subframe being 1 ms long. Each subframe is further divided into two slots, each slot of 0.5 ms (15,360 $T_s$) duration. $T_s$ represents a sampling time and is given as $T_s=1/(15 \text{ kHz} \times 2048)=3.2552 \times 10^{-8}$ (about 33 ns). A slot is defined by a plurality of Orthogonal Frequency Division Multiplexing (OFDM) symbols in time by a plurality of Resource Blocks (RBs) in frequency. One RB has 12 subcarriers by 7 (6) OFDM symbols in the LTE system. A unit time in which data is transmitted, known as Transmission Time Interval (TTI) may be defined by one or more subframes. This radio frame structure is purely exemplary and thus the number of subframes in a radio frame, the number of slots in a subframe, or the number of OFDM symbols in a slot may vary.

Figure 5:
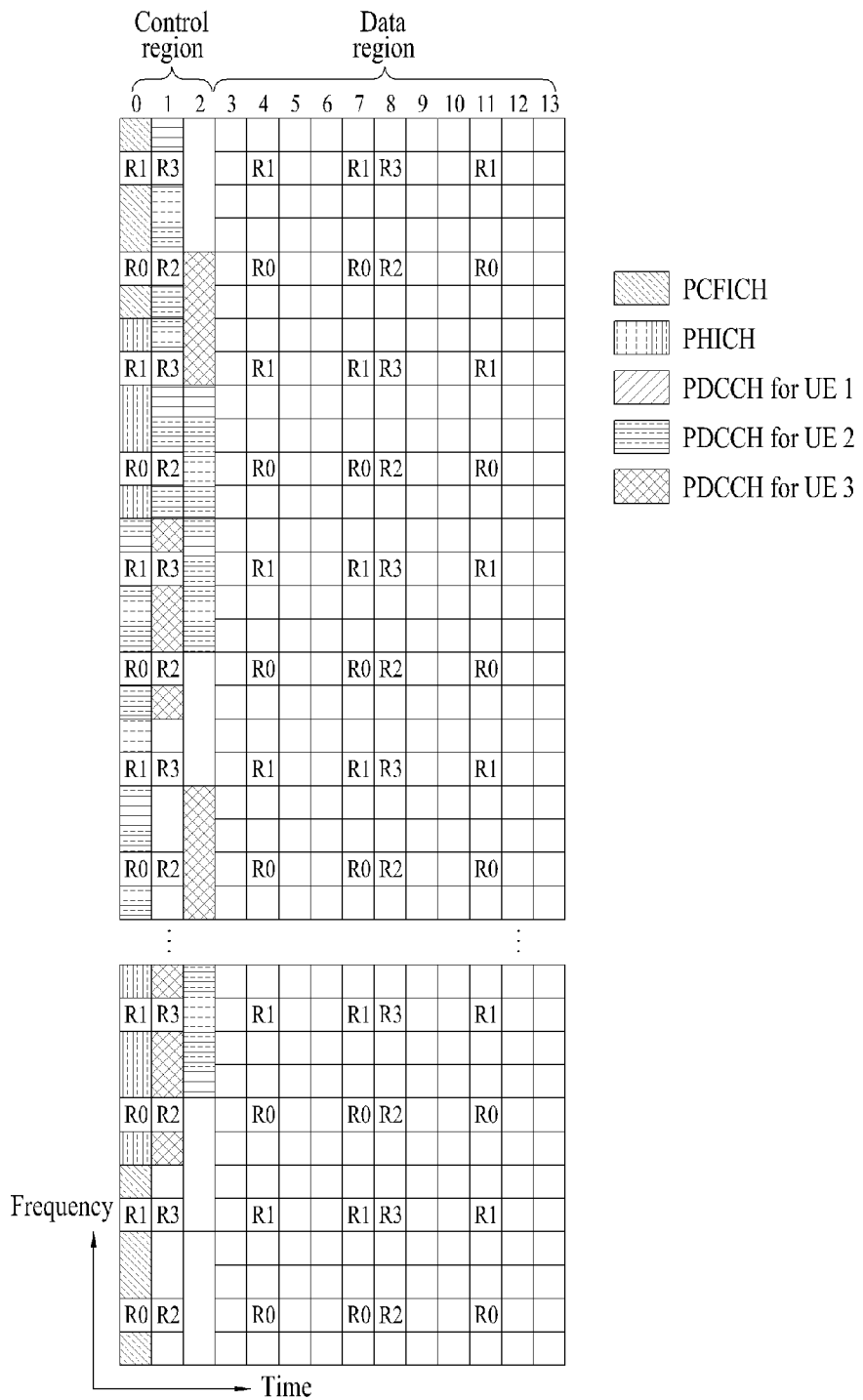
FIG. 5 illustrates a configuration of a downlink radio frame in the LTE system.

FIG. 5 illustrates control channels included in the control region of a subframe in a downlink radio frame.

Referring to FIG. 5, a subframe includes 14 OFDM symbols. A control region occupies the first one to three OFDM symbols and a data region occupies the other 13 to 11 OFDM symbols in the subframe according to the configuration of the subframe. In FIG. 5, reference characters R0 to R3 denote Reference Signals (RSs) or pilot signals for antenna 0 to antenna 3. RSs are transmitted in a predetermined pattern within a subframe irrespective of the control region and the data region of the subframe. Control channels are allocated to resources unused for RSs in the control region, and traffic channels are allocated to resources unused for RSs in the data region. The control channels of the control region are a Physical Control Format Indicator Channel (PCFICH), a Physical Hybrid-ARQ Indicator Channel (PHICH), a Physical Downlink Control Channel (PDCCH), etc.

The PCFICH indicates the number of OFDM symbols used for PDCCHs in every subframe to UEs. The PCFICH is located in the first OFDM symbol and configured with priority over the PHICH and the PDCCHs. The PCFICH includes four Resource Element Groups (REGs), each REG being distributed across the control region based on a cell Identity (ID). One REG has four REs. An RE is a minimum physical resource defined as one subcarrier by one OFDM symbol. A PCFICH value, which is modulated in Quadrature Phase Shift Keying (QPSK), ranges from 1 to 3 or from 2 to 4 according to a bandwidth.

The PHICH carries an HARQ ACK/NACK for uplink transmission. That is, the PHICH is a channel used to deliver an HARQ ACK/NACK for uplink HARQ. The PHICH includes one REG and is scrambled cell-specifically. The ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. The same PHICH (group) occurs three times, for achieving a diversity gain in the frequency and/or time domain.

A PDCCH is allocated to the first n OFDM symbols of a subframe. n is 1 or a larger integer indicated by the PCFICH. The PDCCH includes one or more Control Channel Elements (CCEs). The PDCCH is used to inform a UE or a UE group of the resource allocation of transport channels, namely a PCH and a DownLink SCH (DL-SCH), an uplink scheduling grant, and HARQ information. The PCH and the DL-SCH are transmitted on a PDSCH. Therefore, the eNB and the UE transmit and receive data on a PDSCH except for particular control information or service data.

Information about the destination (one or more UEs) of data of a PDSCH and information about how the UEs should receive and decode the PDSCH data is delivered on a PDCCH. For example, if the Cyclic Redundancy Check (CRC) of a particular PDCCH is masked by Radio Network Temporary Identity (RNTI) "A" and information about data transmitted in radio resources "B" (e.g. a frequency position) with DCI format "C" being a transport format (e.g. a Transport Block (TB) size, a modulation scheme, coding information, etc.) is transmitted in a particular subframe, UEs within the cell of the eNB monitor the PDCCH using their RNTI information. If one or more UEs have RNTI "A", the UEs receive the PDCCH and receive a PDSCH indicated by "B" and "C" based on the received information of the PDCCH.

Channel State Information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO Tx antennas. To acquire CSI from the UE, the eNB may transmit a Reference Signal (RS) to the UE and may command the UE to feed back measured CSI on a PUCCH or PUSCH.

CSI is classified largely into three information types, RI, PMI, and CQI. An RI is information about a channel rank, as described before. The channel rank is the number of streams that a UE can receive in the same time-frequency resources. Because the RI is determined mainly according to the long-term fading of a channel, the RI may be fed back to an eNB in a longer period than a PMI and a CQI.

A PMI is the index of a UE-preferred eNB precoding matrix determined based on a metric such as Signal to Interference and Noise Ratio (SINR), reflecting the spatial characteristics of channels. A CQI represents a channel strength. In general, the CQI reflects a reception SINR that the eNB can achieve with a PMI.

It is expected that the future-generation mobile communication standard, LTE-A will support Coordinated Multi-Point (CoMP) transmission in order to increase data rate, compared to the legacy standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO characterized by data sharing, and CoMP-Coordinated Scheduling/Beamforming (CoMP-CS/CB).

In downlink CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)). In contrast, in downlink CoMP-CS/CB, a UE may receive data instantaneously from one eNB, that is, a serving eNB by beamforming.

In uplink CoMP-JP, eNBs may receive a PUSCH signal from a UE at the same time (Joint Reception (JR)). In contrast, in uplink CoMP-CS/CB, only one eNB receives a PUSCH from a UE. Herein, cooperative cells (or eNBs) may make a decision as to whether to use CoMP-CS/CB.

CoMP may be implemented between heterogeneous networks as well as in a homogeneous network including only macro eNBs.

For Inter-cell Interference Cancellation (ICIC), a method for using a subframe in which an aggressor cell reduces the transmission power of some physical channels or does not transmit the physical channels, that is, an Almost Blank Subframe (ABS) and scheduling a UE, taking into account the use of the ABS frame by a victim cell is under consideration. Hereinbelow, an ABS in which an aggressor cell reduces the transmission power of a physical channel is referred to as a reduced-power ABS, and an ABS in which an aggressor cell does not transmit a physical channel is referred to as a zero-power ABS.

In this case, an interference level for a UE of the victim cell fluctuates depending on subframes. In order to perform a more accurate Radio Link Monitoring (RLM) operation, a Radio Resource Management (RRM) operation of measuring Reference Signal Received Power (RSRP)/Reference Signal Received Quality (RSRQ), etc., or the afore-described CSI measurement operation for link adaptation, the RLM/RRM and CSI measurement should be confined to a subframe set having uniform interference characteristics.

The present invention provides a method for effectively using radio communication resources by efficiently applying ICIC to time resources and frequency resources, in the case where ICIC is used to efficiently mitigate interference in an environment where inter-cell interference exists.

In regard to ICIC for frequency resources, a given frequency area may be divided into one or more sub-frequency areas (e.g. Physical Radio Blocks (PRBs)) and the following indications for each sub-frequency area may be exchanged between cells via an X2 interface in a 3GPP LTE system (conforming to Release 8).

(1) Relative Narrowband Transmission Power (RNTP): An indication indicating DL transmission power that a cell transmitting an ICIC message uses in a sub-frequency area. For example, if an RNTP field for a specific sub-frequency area is set to 0, this may mean that the DL transmission power of the sub-frequency area does not exceed a predetermined threshold, and if the RNTP field for the specific sub-frequency area is set to 1, this may mean that a promise may not be made on the DL transmission power of the sub-frequency area, that is, the DL transmission power of the sub-frequency area may exceed the predetermined threshold.

(2) UL Interference Overload Indication (IOI): An indication indicating the amount of UL interference that a cell transmitting an ICIC message experiences in a sub-frequency area, that is, an indication indicating the amount of UL interference from the perspective of a victim cell. For example, if an IOI field for a specific frequency area is set to High, this means that the victim cell experiences severe UL interference. To mitigate the interference with the cell transmitting the ICIC message, upon receipt of the ICIC message, a cell may schedule UEs using low UL transmission power from among the UEs covered by the cell in the frequency area causing high interference.

(3) UL High Interference Indication (HII): An indication indicating the UL interference sensitivity of an ICIC message-transmitting cell in a sub-frequency area. This is an indication from the perspective of an aggressor cell. For example, if an HII field for a specific sub-frequency area is set to 1, this may mean that the cell transmitting the ICIC message is likely to schedule a UE having high UL transmission power in the specific sub-frequency area. On the other hand, if the HII field for the specific sub-frequency area is set to 0, this may mean that the cell transmitting the ICIC message is likely to schedule a UE having low UL transmission power in the specific sub-frequency area. Then upon receipt of the ICIC message, a cell may use a sub-frequency area with an HII set to 0 from among other sub-frequency areas and may schedule UEs that may perform well against severe interference in a sub-frequency area with an HII set to 1 in order to avoid interference from the cell transmitting the ICIC message.

In regard to ICIC for time resources, a total time area may be divided into a plurality of subframes and it may be indicated for each subframe whether the subframe is to be silenced or is to be transmitted with reduced transmission power in a 3GPP LTE-A system (conforming to Release 10). If a specific subframe is set as a silenced subframe, a cell transmitting an ICIC message for time resources does not schedule a PDSCH or a PUSCH in the subframe (i.e., the subframe is a zero-power ABS). If a specific subframe is set as a subframe with reduced transmission power, a cell transmitting an ICIC message for time resources reduces the transmission power of a PDSCH or PUSCH in the subframe relative to normal subframe transmission, taking into account interference that the PDSCH or the PUSCH causes to another neighbor cell.

If a DL subframe DL SF #n is set as a reduced-power ABS, UEs located relatively near to the center of a corresponding cell may be scheduled for UL transmission. Even though a UL subframe UL SF #(n+k) linked to the DL subframe DL SF #n carrying a UL grant for the UL subframe UL SF #(n+k) (k is an integer larger than 3) is not explicitly set as a subframe to which time-domain ICIC is applied, that is, a subframe with reduced transmission power (i.e. a reduced-power ABS), the UL subframe UL SF #(n+k) may be interpreted as a reduced-power ABS (i.e., a subframe causing less UL interference to a neighbor cell). The reason for scheduling mainly the UEs located relatively near to the center of the cell in the case where the DL subframe SL SF #n is set as a reduced-power ABS is that the transmission power of a channel (e.g., a PDCCH) carrying scheduling information (e.g., a UL grant or a DL grant) is also to be reduced in the DL subframe SL SF #n set as a reduced-power ABS and thus UEs inside the cell, capable of stably decoding control channels with such low reception power are mainly scheduled. The same operation principle applies to a subframe set as a silenced subframe (i.e., a zero-power subframe), for time-domain ICIC.

The present invention may be extended to all cases to which various ICIC schemes are applied as well as a case of using the above-described ICIC schemes for frequency resources and time resources.

Conventionally, a cell may simultaneously transmit the afore-described ICIC messages for frequency resources and time resources. In this case, an ICIC operation has ambiguity because the ICIC message for frequency resources applies to all subframes without any indication indicating a specific subframe, whereas the ICIC message for time resources describes an ICIC operation for all frequency resources in a specific subframe.

In this context, the present invention enables effective use of radio communication resources by providing a method for supporting an efficient ICIC operation even in a situation where an ICIC scheme for frequency resources and an ICIC scheme for time resources are co-existent. Before describing the present invention, a problem that may be encountered with the conventional ICIC schemes for frequency resources and time resources.

Figure 6:
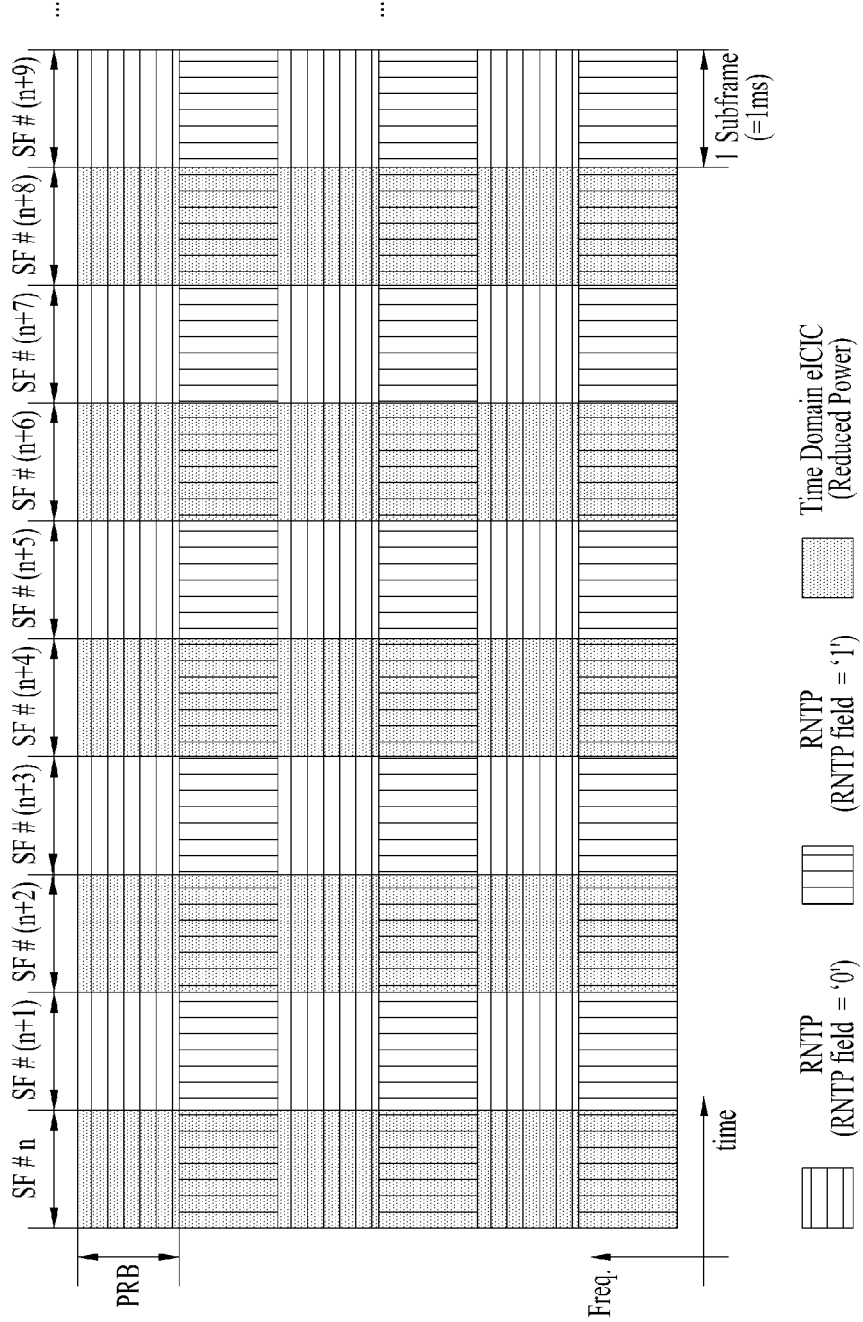
FIG. 6 illustrates an example in which a specific cell simultaneously transmits an Inter-Cell Interference Cancellation (ICIC) message for time resources and an ICIC message for frequency resources to a neighbor cell, for a downlink.

FIG. 6 illustrates an example in which a specific cell simultaneously transmits an ICIC message for time resources and an ICIC message for frequency resources to a neighbor cell, for a DL. Particularly, the ICIC message for frequency resources is the afore-described RNTP by way of example and it is assumed that a system bandwidth is 6 RBs in FIG. 6.

Referring to FIG. 6, if an ICIC message for frequency resources, that is, an RNTP field is set to 0 for a specific PRB area, this means that the DL transmission power of the PRB area does not exceed a predetermined threshold. If the RNTP field is set to 1 for the specific PRB area, this means that a promise may not be made on the DL transmission power of the PRB area, that is, the DL transmission power of the PRB area may exceed the predetermined threshold. It is assumed that a cell transmitting an ICIC message reduces transmission power in even-numbered subframes in an ICIC scheme for time resources.

Figure 7:
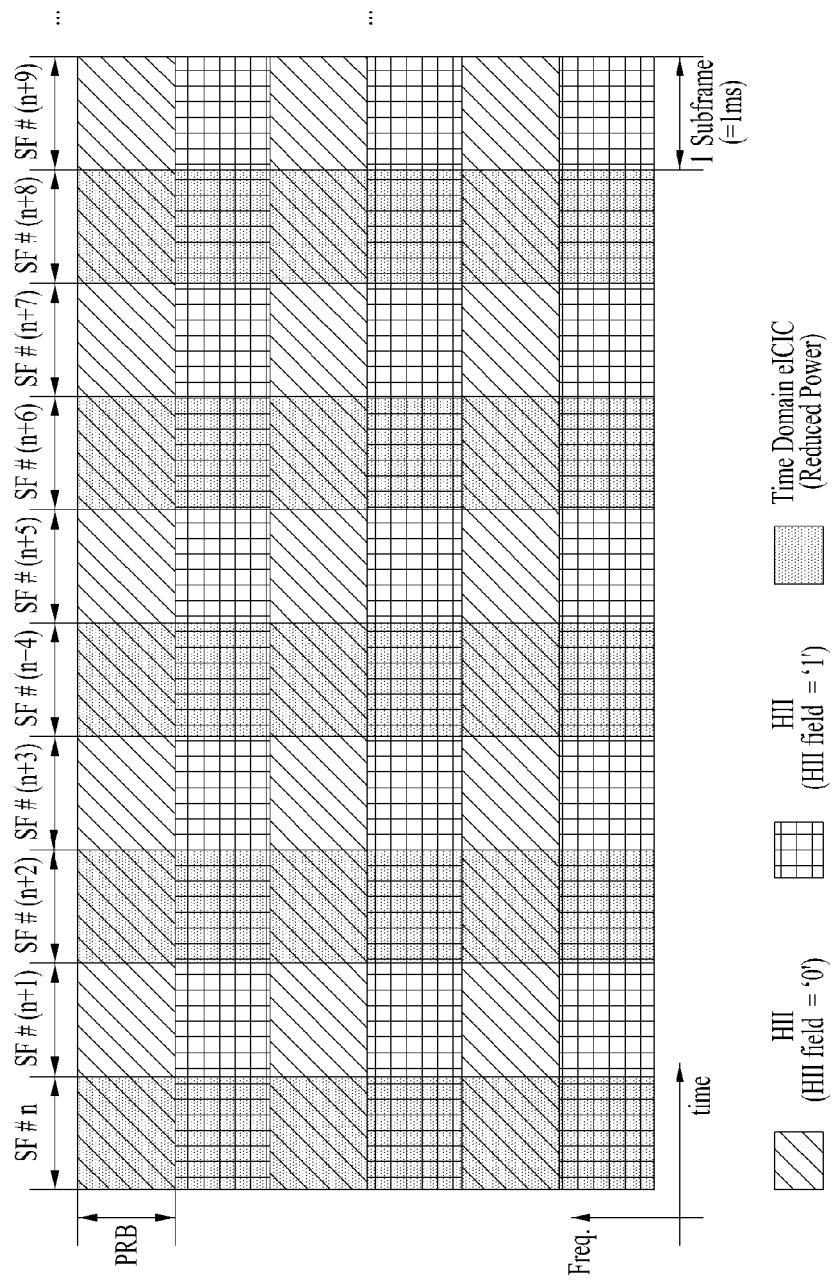
FIG. 7 illustrates an example in which a specific cell simultaneously transmits an ICIC message for time resources and an ICIC message for frequency resources to a neighbor cell, for an uplink.

FIG. 7 illustrates an example in which a specific cell simultaneously transmits an ICIC message for time resources and an ICIC message for frequency resources to a neighbor cell, for a UL. Particularly, the ICIC message for frequency resources is the afore-described HII by way of example, it is assumed that the same ICIC scheme for time resources as illustrated in FIG. 6 is adopted, and a Frequency Division Duplexing (FDD) system is considered, in FIG. 7.

Referring to FIG. 7, if an ICIC message for frequency resources, that is, an HII field is set to 1 for a specific PRB, this means that a cell transmitting the ICIC message is likely to schedule a UE having high UL transmission power in the specific PRB area. On the other hand, if the HII field for the specific PRB area is set to 0, this means that the cell transmitting the ICIC message is likely to schedule a UE having low UL transmission power in the specific PRB area.

As noted from FIGS. 6 and 7, if a neighbor cell simultaneously receives an ICIC message for time resources and an ICIC message for frequency resources (i.e., an RNTP or an HID from a specific cell, the neighbor cell faces ambiguity as to how to use frequency resources for which an RNTP field or an HII field is set to 1 in a subframe to which time-domain ICIC is applied. In other words, this means that interference is low in the time domain and high in the frequency domain, thus causing ambiguity in resource use.

<Embodiment 1>

To solve the above problem, in the case where a frequency-domain ICIC scheme and a time-domain ICIC scheme are used together, a specific cell transmits, to a neighbor cell, multiple ICIC messages for frequency resources according to subframe types (or subframe groups) defined by an ICIC message for time resources (herein, the subframe groups (or types) defined by the ICIC message for time resources may mean subframe groups (or types) having different interferences in time resource areas according to the present invention. In another method, it may be regulated in advance that an ICIC message for frequency resources is not valid in a subframe to which time-domain ICIC is applied.

The multiple ICIC messages for frequency resources correspond to the subframe types (or subframe groups) defined by the ICIC message for time resources and each of the ICIC messages for frequency resources is valid only in a corresponding subframe type (or subframe group).

This method may enable a neighbor cell that receives ICIC messages for frequency resources and time resources simultaneously from a specific cell to use frequency resources in an explicitly or independently flexible manner in a subframe to which time-domain ICIC is applied.

Figure 8:
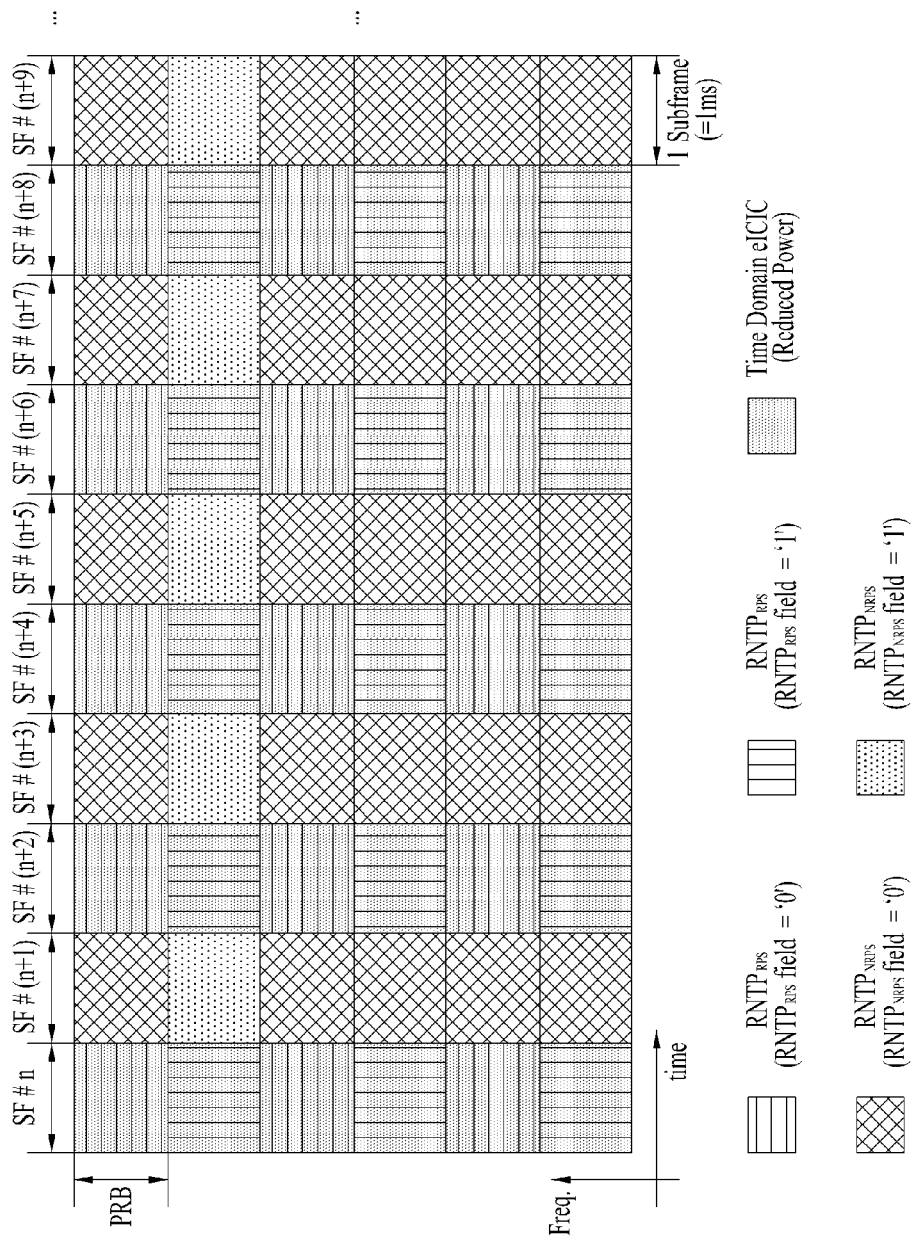
FIG. 8 illustrates an example to which an embodiment of the present invention is applied in the same situation as illustrated in FIG. 6.

FIG. 8 illustrates an example to which an embodiment of the present invention is applied in the same situation as illustrated in FIG. 6.

In the illustrated case of FIG. 6, an ICIC message for time resources defines two subframe types (or subframe groups): reduced-power subframe and non-reduced-power subframe (i.e. normal subframe). Accordingly, the present invention may clarify an operation for using frequency resources in a neighbor cell by transmitting an ICIC message for the frequency resources of a reduced-power subframe and an ICIC message for the frequency resources of a non-reduced-power subframe to another neighbor cell by a specific cell.

Referring to FIG. 8, an ICIC message for the frequency resources of a reduced-power subframe is defined as $RNTP_{RPS}$ and an ICIC message for the frequency resources of a non-reduced-power subframe is defined as $RNTP_{NRPS}$. If an $RNTP_{RPS}$ field is set to 0 in a time-domain ICIC subframe, the neighbor cell may effectively use the frequency resources of the time-domain ICIC subframe for the purpose of DL transmission.

Figure 9:
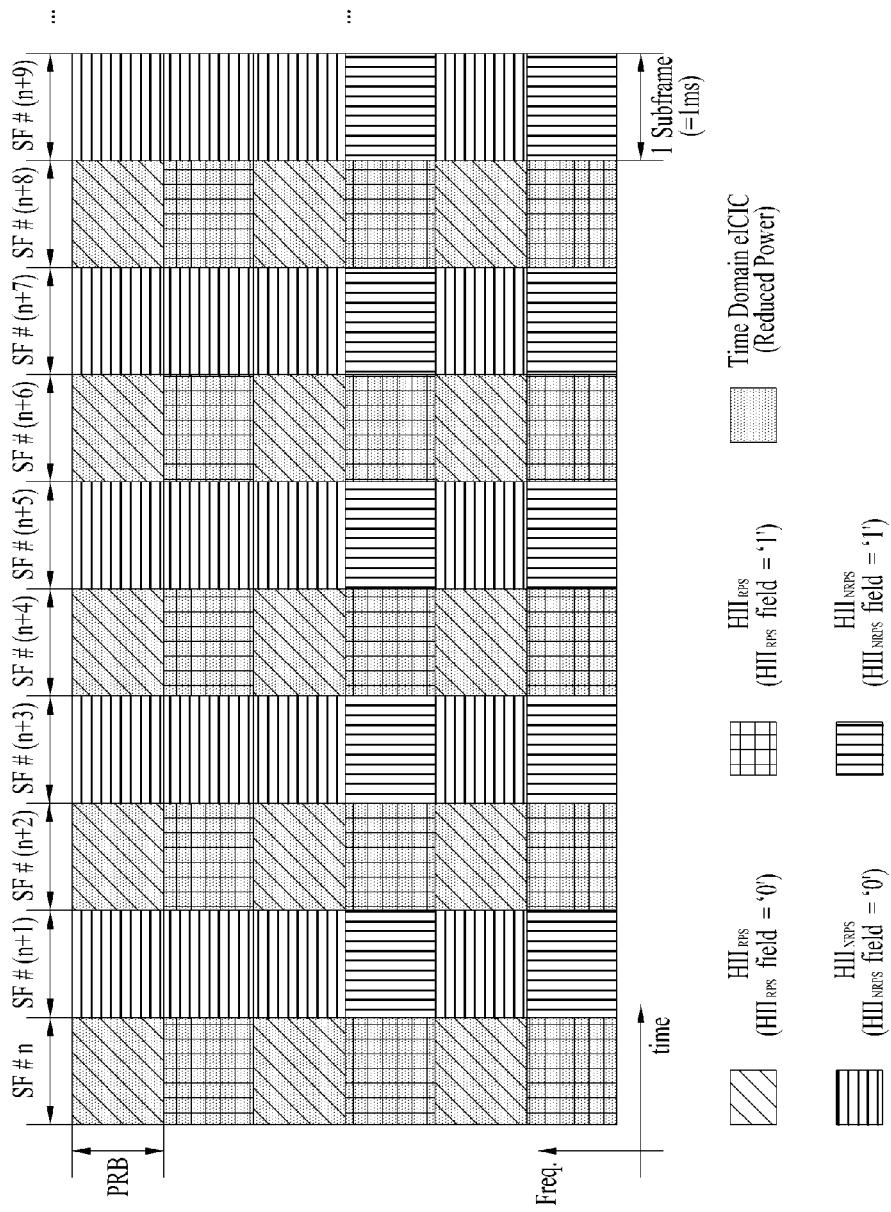
FIG. 9 illustrates an example to which the embodiment of the present invention is applied in the same situation as illustrated in FIG. 7.

FIG. 9 illustrates an example to which the embodiment of the present invention is applied in the same situation as illustrated in FIG. 9.

In the illustrated case of FIGS. 7 and 9, an ICIC message for time resources also defines two subframe types (or subframe groups): reduced-power subframe and non-reduced-power subframe (i.e. normal subframe).

Accordingly, an ICIC message for the frequency resources of a reduced-power subframe is defined as $HII_{RPS}$ and an ICIC message for the frequency resources of a non-reduced-power subframe is defined as $HII_{NRPS}$. If an $HII_{RPS}$ field is set to 0 in a time-domain ICIC subframe, the neighbor cell may effectively use the frequency resources of the time-domain ICIC subframe for the purpose of UL transmission.

If the specific cell receives an IOI for a sub-frequency area (e.g., a PRB) from the neighbor cell and implements time-domain ICIC as reduction of transmission power, the cell faces ambiguity as to how to use the frequency resources of a time-domain ICIC subframe.

In this case, multiple ICIC messages for frequency resources (i.e. IOIs) are transmitted according to subframe types (or subframe groups) defined by an ICIC message for time resources in the embodiment of the present invention. Or it may be regulated in advance between cells that an IOI is not valid in a time-domain ICIC subframe.

<Embodiment 2>

To solve the afore-described problem, in the case where both frequency-domain ICIC and time-domain ICIC are implemented, a specific cell indicates a cyclic shifting offset to a neighbor cell, along with transmission of an ICIC message for frequency resources in another embodiment of the present invention.

For example, upon receipt of an ICIC message for frequency resources together with a cyclic shifting offset from the specific cell, the neighbor cell may apply the ICIC message for frequency resources (e.g., bitmap information configured to apply ICIC to predetermined fragments of frequency resources) through cyclic shifting by the offset, thereby efficiently using the frequency resources relative to the conventional technology.

Specifically, if the neighbor cell receives '101010' as an RNTP and '01' as a cyclic shifting offset from the specific cell, the neighbor cell changes the ICIC message for frequency resources to '010101' for a time-domain ICIC subframe. On the other hand, the ICIC message '101010' is applied as it is in a non-time-domain ICIC subframe.

Or upon receipt of an ICIC message for frequency resources together with a preset cyclic shifting offset from the specific cell, the neighbor cell may assume that all frequency resources are available in a time-domain ICIC subframe.

<Embodiment 3>

To solve the afore-described problem, in the case where both frequency-domain ICIC and time-domain ICIC are implemented, a specific cell indicates to a neighbor cell whether frequency resources of a time-domain ICIC subframe are available by transmitting an additional indication along with an ICIC message for frequency resources (e.g., an RNTP, an HII, or an IOI).

For example, if the additional indication is set to 1, the neighbor cell may use all of the frequency resources of the time-domain ICIC subframe. On the contrary, if the additional indication is set to 0, the neighbor cell may use none of the frequency resources of the time-domain ICIC subframe.

<Embodiment 4>

A specific cell may indicate a plurality of RNTP thresholds for one RNTP message to a neighbor cell. For example, if the specific cell has transmitted two thresholds, threshold A and threshold B (B>A) for one RNTP message to the neighbor cell, the neighbor cell may determine that transmission power candidates P for a frequency area are 'P<A', 'A≤P≤B', and 'B<P'. In this case, the specific cell may indicate a transmission power range (i.e., one of 'P<A', 'A≤P≤B', and 'B<P') applied to the frequency area (a partial frequency area or a preset unit) to the neighbor cell by transmitting an RNTP for the frequency area in 2 bits.

If both frequency-domain ICIC and time-domain ICIC are used, the specific cell may transmit, to the neighbor cell, multiple RNTP thresholds according to subframe types (or subframe groups) defined by an ICIC message for time resources.

The multiple RNTP thresholds correspond to the subframe types (or subframe groups) defined by the ICIC message for time resources and each of the RNTP thresholds is valid only in a corresponding subframe type (or subframe group). This method may enable a neighbor cell that receives ICIC messages for frequency resources and time resources simultaneously from a specific cell to use frequency resources in an explicitly or independently flexible manner in a time-domain ICIC subframe.

When the specific cell transmits an ICIC message for time resources to the neighbor cell, the specific cell may also indicate a transmission power threshold set by the specific cell for a time-domain ICIC subframe to the neighbor cell. For example, if an ICIC message for time resources is implemented as a power-reduced ABS, the neighbor cell may use radio resources more efficiently/more clearly, taking into account the amount of interference caused by the specific cell in a time-domain ICIC subframe, by receiving the afore-described information.

This proposal may be extended in such a manner that if the specific cell transmits a plurality of ICIC messages for time resources to the neighbor cell, the neighbor cell also indicates thresholds corresponding to the respective ICIC messages (for time resources).

In another method, the specific cell may indicate a plurality of thresholds corresponding to a single ICIC message for time resources to the neighbor cell. If the specific cell has transmitted two thresholds, threshold A and threshold B (B>A) for one RNTP message to the neighbor cell, the neighbor cell may determine that transmission power candidates P for a frequency area are 'P<A', 'A≤P≤B', and 'B<P'. In this case, the specific cell may indicate a transmission power range (i.e., one of 'P<A', 'A≤P≤B', and 'B<P') applied to a time-domain ICIC subframe (or a non-time-domain ICIC subframe) to the neighbor cell by indicating the time-domain ICIC subframe in 2 bits.

In another method, if the specific cell simultaneously transmits an ICIC message for time resources and an ICIC message for frequency resources to the neighbor cell, the specific cell may indicate, to the neighbor cell, a transmission power threshold (or a set value) for a time-domain ICIC subframe (e.g., a power-zero ABS or a power-reduced ABS) as an offset to a threshold for an ICIC message for frequency resources.

For example, upon receipt of a power-reduced ABS message, an RNTP message (i.e., RNTP threshold X), and an offset (i.e., offset Y) from the specific cell, the neighbor cell may assume that the specific cell has set a transmission power threshold (or a set value) for a time-domain ICIC subframe to 'X+Y'. Further, the neighbor cell may assume that the threshold (or set value) 'X+Y' applies to the total frequency area of a time-domain ICIC subframe. Or the neighbor cell may assume that the threshold (or set value) 'X+Y' is valid only in a frequency area with an RNTP field set to 1 in a time-domain ICIC subframe (i.e., the DL transmission power of a specific PRB area exceeds a predetermined threshold) and the specific cell operates based on the existing RNTP threshold in a frequency area with an RNTP field set to 0 (i.e., the DL transmission power of a specific PRB area does not exceed the predetermined threshold) (or in the remaining area except for a preset frequency area) in the time-domain ICIC subframe.

<Embodiment 5>

If a neighbor cell interprets a UL subframe UL SF #(n+k) (k is an integer larger than 3) linked to a power-reduced ABS (i.e. DL SF #n) as a power-reduced ABS based on an ICIC message for time resources received from a specific cell, the neighbor cell faces ambiguity as to defining the UL subframe UL SF #(n+k) linked to the DL subframe DL SF #n (i.e. a power-reduced ABS) in a TDD system.

That is, in the TDD system, a PUSCH transmission time based on a UL grant received in the DL subframe DL SF #n may be different from a UL ACK/NACK transmission time for DL data received in the same DL subframe DL SF #n.

Figure 10:
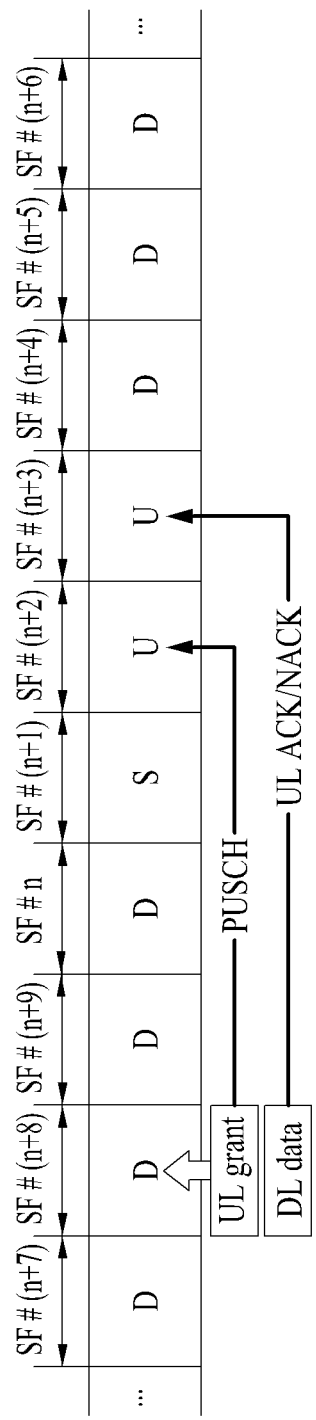
FIG. 10 illustrates a fifth embodiment of the present invention.

FIG. 10 illustrates a fifth embodiment of the present invention.

Referring to FIG. 10, when a UL grant is transmitted in a DL subframe DL SF #n under a specific UL-DL subframe configuration in a TDD system, a PUSCH transmission time based on a UL grant received in the DL subframe DL SF #n may be different from a UL ACK/NACK transmission time for DL data received in the same DL subframe DL SF #n.

Herein, UL-DL subframe configuration #4 (i.e., "DSUUDDDDDD") is assumed and a PUSCH transmission time based on a UL grant received in a DL subframe DL SF #8 is different from UL ACK/NACK transmission times UL SF #2 and UL SF #3 for DL data received in the DL subframe DL SF #8.

Therefore, if the neighbor cell interprets a UL subframe UL SF #(n+k) (k is an integer larger than 3) linked to a power-reduced ABS (i.e. DL SF #n) as a power-reduced ABS based on an ICIC message for time resources received from a specific cell in a TDD system, it is proposed that the neighbor cell considers the UL subframe UL SF #(n+k) (k is an integer larger than 3) linked to the DL subframe DL SF #n (i.e. a power-reduced ABS) as a power-reduced ABS according to a PUSCH (transmission) timing rule (or considers the UL subframe UL SF #(n+k) (k is an integer larger than 3) linked to the DL subframe DL SF #n (i.e. a power-reduced ABS) as a power-reduced ABS according to a PUCCH (transmission) timing rule or considers UL subframes carrying a PUSCH/PUCCH linked to the DL subframe DL SF #n (i.e. a power-reduced ABS) as a power-reduced ABS according to the PUSCH/PUCCH (transmission) timing rule).

For example, if the neighbor cell receives a DL subframe DL SF #(n+8) as a power-reduced ABS in the situation of FIG. 10, the neighbor cell may use the whole or a part of the frequency resources of a UL subframe UL SF #(n+2) (after the DL subframe DL SF #(n+8)) according to a preset rule, considering the UL subframe UL SF #(n+2) as a power-reduced ABS.

In addition, the specific cell may mitigate interference caused by transmission of a UL ACK/NACK of the neighbor cell by indicating only a PUCCH resource area to the neighbor cell by setting an HII. Herein, a plurality of HIIs may be set according to subframes types (or subframe groups) defined by an ICIC message for time resources.

The present invention is applicable to any environment where frequency-domain ICIC or time-domain ICIC is independently implemented as well as an environment where both frequency-domain ICIC and time-domain ICIC are implemented. In addition, the present invention is applicable to a case where frequency-domain ICIC or time-domain ICIC is implemented in a Carrier Aggregation (CA) environment, for example, an environment where interference exists in an intra-band (or between co-channels) (or an environment where interference exists between an extension carrier and a legacy carrier or between extension carriers). For example, if different eNBs use Component Carriers (CCs) of the same band, a specific eNB may transmit ICIC messages for a plurality of frequency resources for the respective CCs (to a neighbor cell using a CC of the same band) according to subframe types (or subframe groups) defined by an ICIC message for time resources. Additionally, the present invention may be extended to a case where frequency-domain ICIC or time-domain ICIC is implemented independently as well as a case where both frequency-domain ICIC and time-domain ICIC are implemented in an environment where an eNB dynamically changes the usage of specific radio resources according to system load or communication is conducted between UEs (i.e. Device to Device (D2D) communication). Further, the present invention may be extended to a case where frequency-domain ICIC or time-domain ICIC is implemented independently for an Enhanced PDCCH (E-PDCCH) transmission region, a PDSCH transmission region, and/or a PDCCH transmission region as well as a case where both frequency-domain ICIC and time-domain ICIC are implemented for an E-PDCCH transmission region, a PDSCH transmission region, and/or a PDCCH transmission region in an environment where eNBs communicate by cooperation or control information is transmitted in a PDSCH region (as well as in a legacy PDCCH region).

Figure 11:
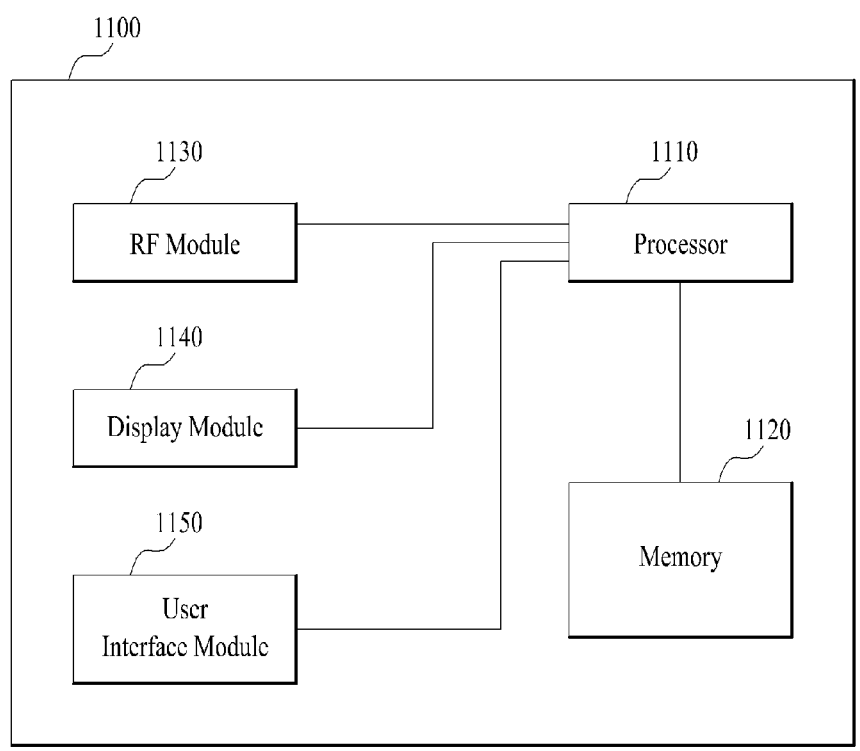
FIG. 11 is a block diagram of a communication apparatus according to an embodiment of the present invention.

FIG. 11 is a block diagram of a communication apparatus according to an embodiment of the present invention.

Referring to FIG. 11, a communication apparatus 1100 includes a processor 1110, a memory 1120, a Radio Frequency (RF) module 1130, a display module 1140, and a User Interface (UI) module 1150.

The communication device 1100 is shown as having the configuration illustrated in FIG. 11, for the convenience of description. Some modules may be added to or omitted from the communication apparatus 1100. In addition, a module of the communication apparatus 1100 may be divided into more modules. The processor 1110 is configured to perform operations according to the embodiments of the present invention described before with reference to the drawings. Specifically, for detailed operations of the processor 1110, the descriptions of FIGS. 1 to 10 may be referred to.

The memory 1120 is connected to the processor 1110 and stores an Operating System (OS), applications, program codes, data, etc. The RF module 1130, which is connected to the processor 1110, upconverts a baseband signal to an RF signal or downconverts an RF signal to a baseband signal. For this purpose, the RF module 1130 performs digital-to-analog conversion, amplification, filtering, and frequency upconversion or performs these processes reversely. The display module 1140 is connected to the processor 1110 and displays various types of information. The display module 1140 may be configured as, not limited to, a known component such as a Liquid Crystal Display (LCD), a Light Emitting Diode (LED) display, and an Organic Light Emitting Diode (OLED) display. The UI module 1150 is connected to the processor 1110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the method and apparatus for mitigating inter-cell interference in a wireless communication system have been described mainly in the context of a 3GPP LTE system, they are applicable to many other wireless communication systems.

The invention claimed is:

1. A method for canceling inter-cell interference in a wireless communication system, the method comprising:
receiving from a neighbor cell, time resource interference information indicating whether a subframe is a reduced-power almost blank subframe (ABS) or a normal subframe;
receiving from the neighbor cell, first frequency resource interference information related to the reduced-power ABS and a plurality of first thresholds related to the reduced-power ABS;
receiving from the neighbor cell, second frequency resource interference information related to the normal subframe and a plurality of second thresholds related to the normal subframe;
performing downlink communication and uplink communication by using the first frequency resource interference information in the reduced-power ABS; and
performing downlink communication and uplink communication by using the second frequency resource interference information in the normal subframe,
wherein the first frequency resource interference information indicates a range of transmission power of the neighbor cell in the reduced-power ABS based on the plurality of first thresholds, and
wherein the second frequency resource interference information indicates a range of transmission power of the neighbor cell in the normal subframe based on the plurality of second thresholds.

2. The method according to claim 1, wherein the first frequency resource interference information indicates whether interference with a frequency band in the reduced-power ABS caused by the neighbor cell is equal to or larger than a threshold, and
wherein the second frequency resource interference information indicates whether interference with a frequency band in the normal subframe caused by the neighbor cell is equal to or larger than a threshold.

3. The method according to claim 1, wherein the first frequency resource interference information indicates whether transmission power used in the reduced-power ABS by the neighbor cell is equal to or larger than a threshold according to a frequency band, and
wherein the second frequency resource interference information indicates whether transmission power used in the normal subframe by the neighbor cell is equal to or larger than a threshold according to a frequency band.

4. The method according to claim 2, wherein the threshold for the first frequency resource interference information is different from the threshold for the second frequency resource interference information.

5. The method according to claim 3, wherein the threshold for the first frequency resource interference information is different from the threshold for the second frequency resource interference information.

6. The method according to claim 1, wherein the second frequency resource interference information includes a specific indicator indicating whether a frequency resource of the reduced-power ABS is available, and
wherein performing downlink communication and uplink communication by using the second frequency resource interference information in the reduced-power ABS comprises:
performing downlink communication and uplink communication by using the second frequency resource interference information in the reduced-power ABS, when the specific indicator indicates that the frequency resource of the reduced-power ABS is available; and
not performing downlink communication and uplink communication in the reduced-power ABS, when the specific indicator indicates that the frequency resource of the reduced-power ABS is not available.

7. The method according to claim 1, wherein the plurality of first thresholds includes a first value and a second value, wherein the second value is bigger than the first value, and
wherein the first frequency resource interference information indicates that the transmission power of the neighbor cell belongs to a specific range among a first range that the transmission power of the neighbor cell is smaller than the first value, a second range that the transmission power of the neighbor cell is between the first value and the second value, and a third range that the transmission power of the neighbor cell is bigger than the second value.

8. An apparatus for canceling inter-cell interference in a wireless communication system, the apparatus comprising:
a radio frequency module configured to transceiver wire/wireless signals; and
a processor configured to:
receive from a neighbor cell, time resource interference information indicating whether a subframe is a reduced-power almost blank subframe (ABS) or a normal subframe through the radio frequency module,
receive from the neighbor cell, first frequency resource interference information related to the reduced-power ABS and a plurality of first thresholds related to the reduced-power ABS through the radio frequency module,
receive from the neighbor cell, second frequency resource interference information related to the normal subframe and a plurality of second thresholds related to the normal subframe through the radio frequency module,
perform downlink communication and uplink communication by using the first frequency resource interference information in the reduced-power ABS, and
perform downlink communication and uplink communication by using the second frequency resource interference information in the normal subframe,
wherein the first frequency resource interference information indicates a range of transmission power of the neighbor cell in the reduced-power ABS based on the plurality of first thresholds, and
wherein the second frequency resource interference information indicates a range of transmission power of the neighbor cell in the normal subframe based on the plurality of second thresholds.

9. The apparatus according to claim 8, wherein the first frequency resource interference information indicates whether interference with a frequency band in the reduced-power ABS caused by the neighbor cell is equal to or larger than a threshold, and
wherein the second frequency resource interference information indicates whether interference with a frequency band in the normal subframe caused by the neighbor cell is equal to or larger than a threshold.

10. The apparatus according to claim 8, wherein the first frequency resource interference information indicates whether transmission power used in the reduced-power ABS by the neighbor cell is equal to or larger than a threshold according to a frequency band, and
wherein the second frequency resource interference information indicates whether transmission power used in the normal subframe by the neighbor cell is equal to or larger than a threshold according to a frequency band.

11. The apparatus according to claim 9, wherein the threshold for the first frequency resource interference information is different from the threshold for the second frequency resource interference information.

12. The apparatus according to claim 10, wherein the threshold for the first frequency resource interference information is different from the threshold for the second frequency resource interference information.

13. The apparatus according to claim 8, wherein the second frequency resource interference information includes a specific indicator indicating whether a frequency resource of the reduced-power ABS is available, and
wherein the processor performs downlink communication and uplink communication by using the second frequency resource interference information in the reduced-power ABS, when the specific indicator indicates that the frequency resource of the reduced-power ABS is available, and does not perform downlink communication and uplink communication in the reduced-power ABS, when the specific indicator indicates that the frequency resource of the reduced-power ABS is not available.

14. The apparatus according to claim 8, wherein the plurality of first thresholds comprise a first value and a second value,
wherein the second value is bigger than the first value, and
wherein the first frequency resource interference information indicates that the transmission power of the neighbor cell belongs to a specific range among a first range that the transmission power of the neighbor cell is smaller than the first value, a second range that the transmission power of the neighbor cell is between the first vale and the second value, and a third range that the transmission power of the neighbor cell is bigger than the second value.

* * * * *